United States Patent [19]

Narita et al.

[11] Patent Number: 5,303,467
[45] Date of Patent: Apr. 19, 1994

[54] METHOD OF ASEMBLING ROCKER ARMS

[75] Inventors: Yousuke Narita; Kazutoshi Takada, both of Sayama, Japan

[73] Assignee: Honda Giken Kogyo Kabushiki Kaisha, Tokyo, Japan

[21] Appl. No.: 63,304

[22] Filed: May 19, 1993

[30] Foreign Application Priority Data

| May 21, 1992 | [JP] | Japan | 4-129000 |
| May 21, 1992 | [JP] | Japan | 4-129001 |
| May 21, 1992 | [JP] | Japan | 4-129002 |

[51] Int. Cl.$^5$ ............................................. B23P 15/00
[52] U.S. Cl. ................................. 29/888.2; 29/888.01
[58] Field of Search .............. 29/888.2, 888, 888.01, 29/428; 74/519

[56] References Cited
FOREIGN PATENT DOCUMENTS

| 1-103242 | 4/1989 | Japan . | |
| 1-177402 | 7/1989 | Japan . | |
| 2-243231 | 9/1990 | Japan | 29/888.2 |
| 3-003738 | 1/1991 | Japan | 29/888.2 |
| 3-3739 | 1/1991 | Japan . | |
| 3-003739 | 1/1991 | Japan | 29/888.2 |
| 3-32534 | 2/1991 | Japan . | |
| 3-40515 | 2/1991 | Japan . | |

*Primary Examiner*—Irene Cuda
*Attorney, Agent, or Firm*—Armstrong, Westerman, Hattori, McLeland & Naughton

[57] ABSTRACT

Rocker arms are assembled by providing a plurality of holder members in series at a predetermined pitch and rotatably supporting the rocker arms by shafts which are supported by the plurality of holder members. First, rocker arm units are assembled by inserting into the rocker arms shafts which are longer than a distance between facing side surfaces of two pieces of the adjoining holder members. Then, the rocker arm units are set into spaces between respective holder members which are provisionally set at a distance which is larger than the predetermined pitch. This setting is made such that the axial line of the rocker arm shafts coincides with axes of bearing holes which are formed in the holder members. Then, the distance between the holder members is narrowed down to the predetermined pitch to thereby insert end portions of the rocker arm shafts into the bearing holes.

11 Claims, 15 Drawing Sheets

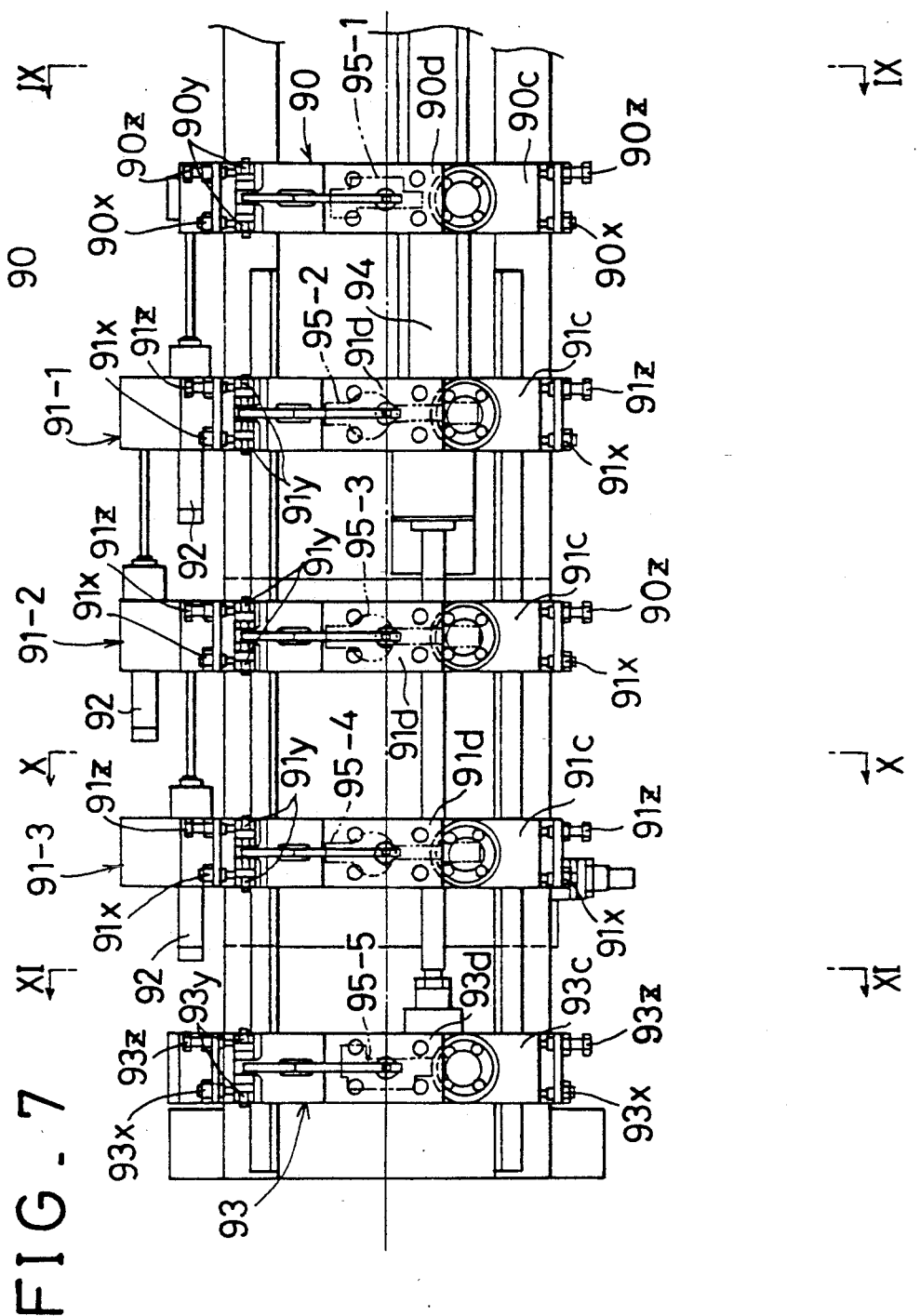
FIG._7

FIG_13(a)
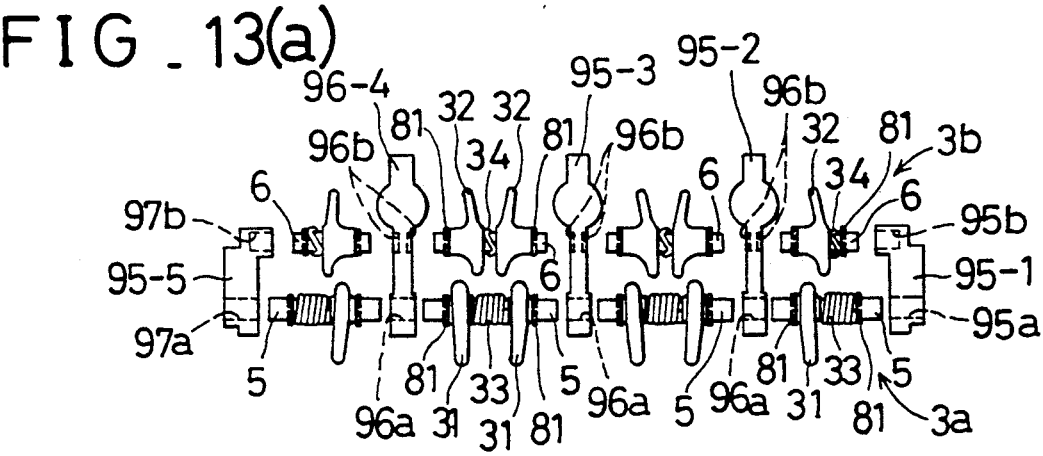
FIG_13(b)
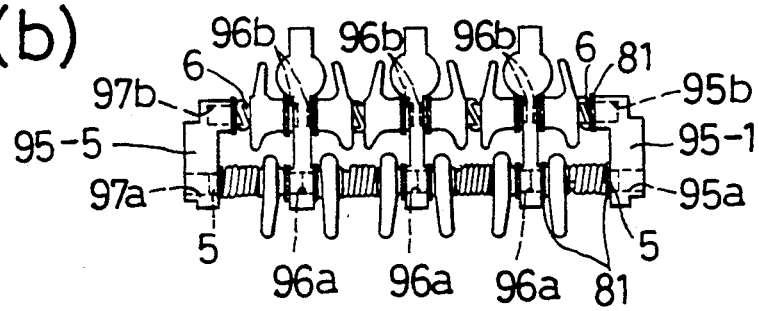
FIG_13(c)
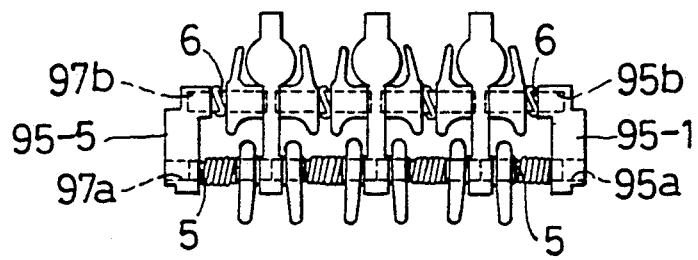
FIG_13(d)
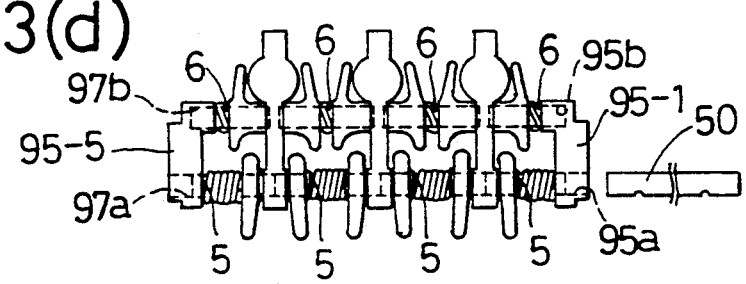
FIG_13(e)
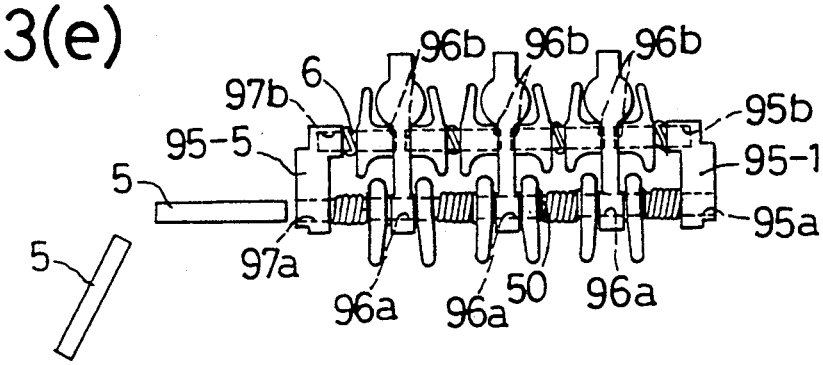

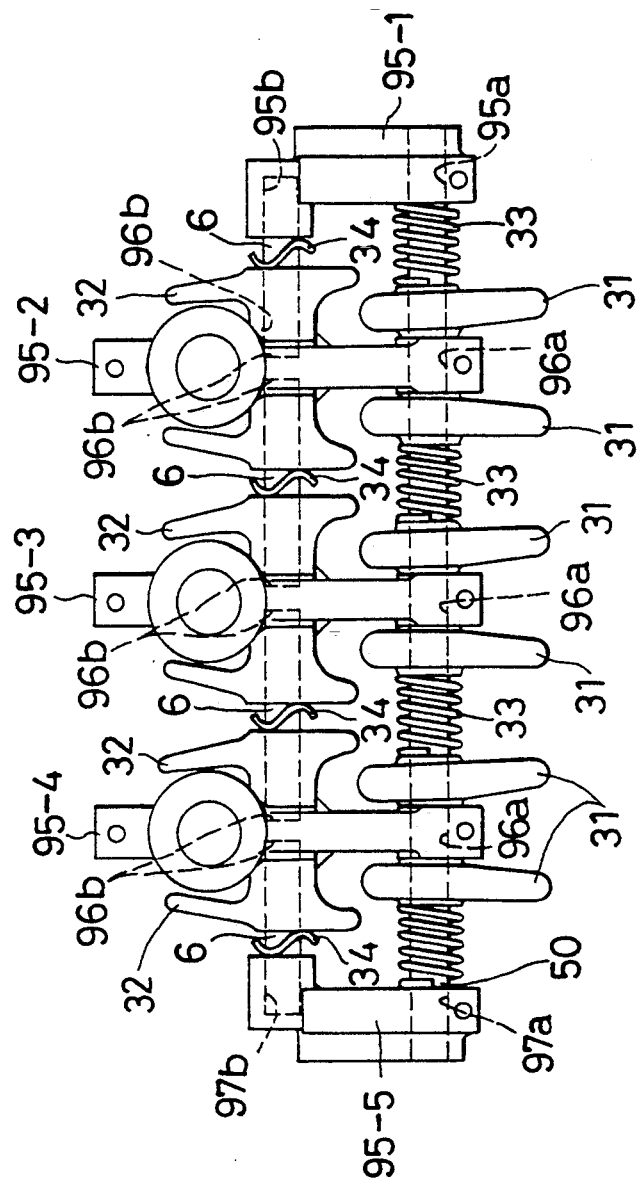
FIG._14

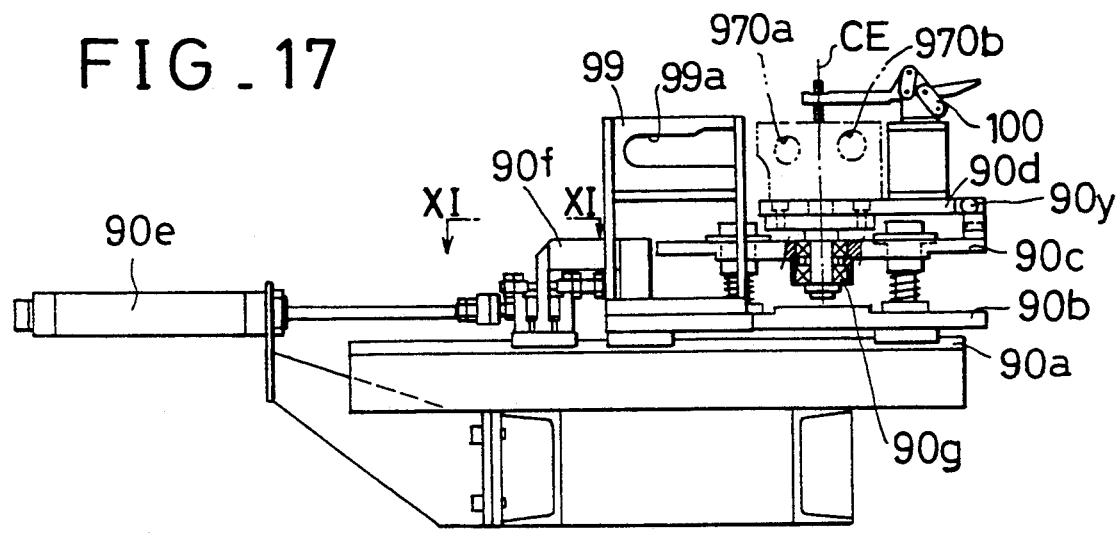
FIG_17
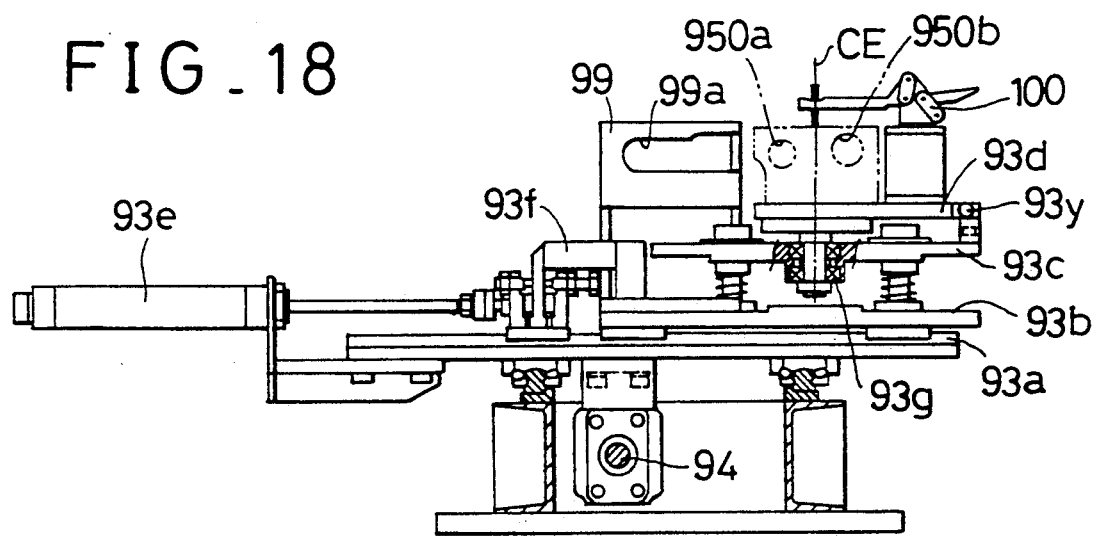
FIG_18

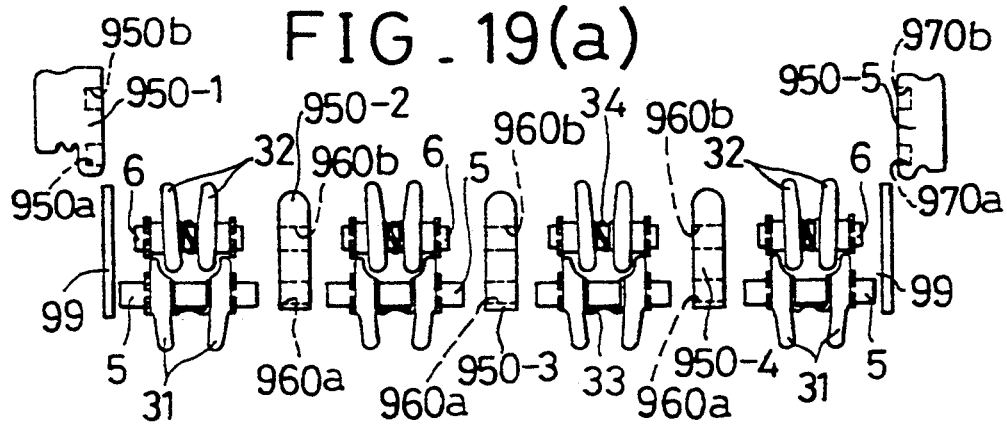
FIG_19(a)
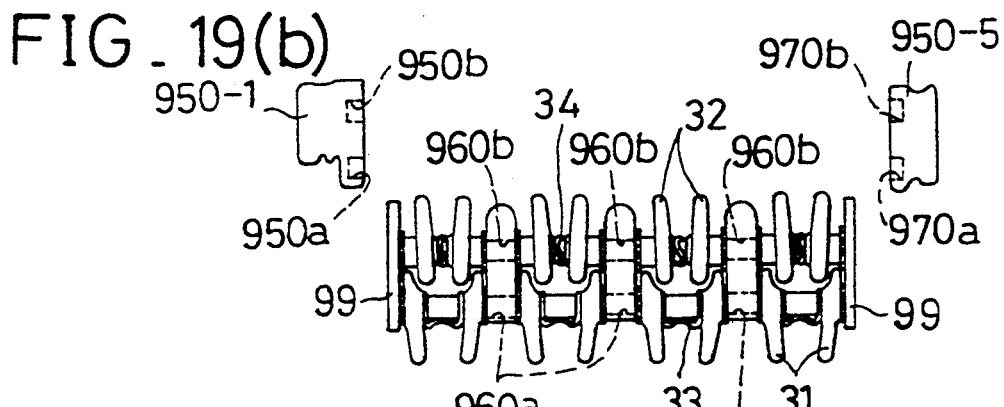
FIG_19(b)
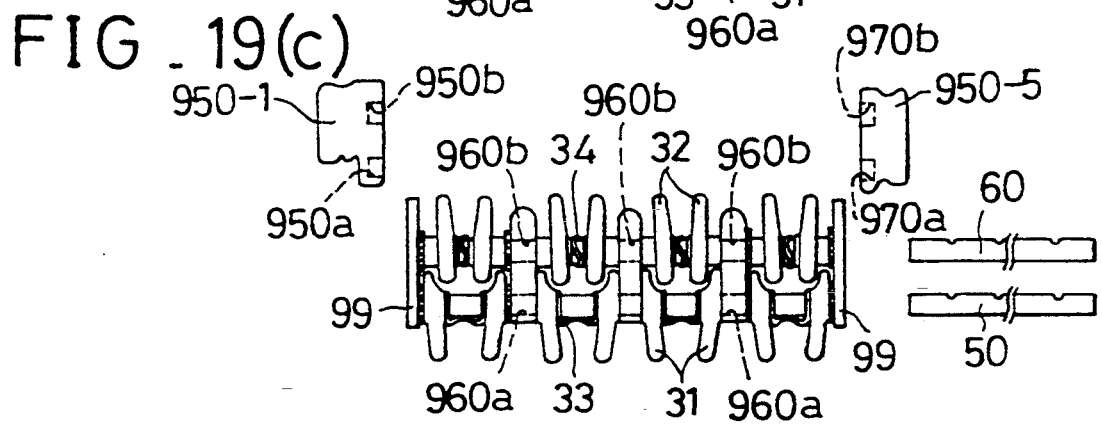
FIG_19(c)
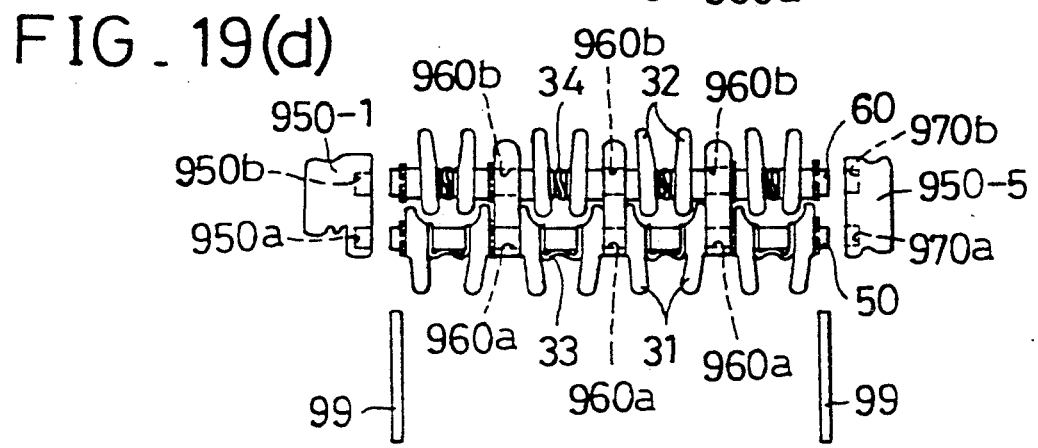
FIG_19(d)

METHOD OF ASEMBLING ROCKER ARMS

BACKGROUND OF THE INVENTION

The present invention relates to a method of assembling rocker arms in which a plurality of holder members are arranged in series and in which the rocker arms are assembled into a space between each of the holder members.

DESCRIPTION OF THE RELATED ART

There is a case in which a plug hole for mounting therein an ignition plug is formed in a holder member which supports the rocker arms. Then, in order to prevent the interference with the ignition plug, a rocker arm shaft for rotatably supporting the rocker arms is sometimes made into short rocker arm shafts which are supported at both ends thereof on adjoining holder members.

As a method of assembling rocker arms of this kind of construction, there is known the following method in Japanese Published Unexamined Patent Application No. 103242/1989. Namely, in each space between holder members which are provisionally set at a larger distance than when they have finally been assembled, there is interposed a rocker arm unit which is provisionally assembled or half-assembled by inserting a short rocker arm shaft into a rocker arm or arms and a wave washer which maintains an axial position of the rocker arm or arms. This provisional assembling is done by setting the rocker arm unit on a jig by making external surfaces thereof as a basis for alignment. Thereafter, the distance between respective adjoining holder members is shortened down to a predetermined pitch, whereby end portions of the short rocker arm are caused to be inserted into bearing holes which are provided in the holder members.

In case the rocker arm shaft does not interfere with the ignition plugs, the rocker arm shaft may be made by a long rocker arm shaft which is supported in a penetrating manner through the entire rocker arm shafts.

As a method of assembling rocker arms of this kind of construction, there is disclosed the following method in Japanese Published Unexamined Patent Application No. 32534/1992. Namely, on pallets which are circulated while being mounted on a conveyor, there are set holder members at a respective distance which is larger than the above-described predetermined pitch. Under a condition in which rocker arms and springs for maintaining the axial positions of the rocker arms are placed in a space between each of the holder members, dummy shafts which are longer than the rocker arm shafts are inserted, from one side of the arrangement in series of the holder members, into bearing holes which are provided in each of the holder members, such that they penetrate throughout the holder members. Rocker arms and springs which are present between the respective holder members are thus made to be rotatably supported by the dummy shafts. The respective distances between adjoining holder members are then narrowed down to the predetermined pitch while guiding them by the dummy shafts. Thereafter, the rocker arm shafts are inserted from the other side of the arrangement in series of the holder members so as to penetrate throughout the holder members, thereby replacing the dummy shafts with the rocker arm shafts. The rocker arms and springs which are supported by the dummy shafts are thus rotatably supported by the rocker arm shafts.

In the above-described conventional methods, the rocker arms and springs are respectively set on the jig as independent pieces or are set on the jig as provisionally assembled rocker arm units before being interposed between the respective holder members. Therefore, in case foreign matter such as dirt or the like are pinched or present between a seat surface or a receiving surface of the jig and the rocker arm or the like, the alignment or concentricity of the rocker arms and the springs relative to the bearing holes or the concentricity of the short rocker arm shaft relative to the baring holes can no longer be maintained. As a consequence, when the long rocker arm shaft is inserted into those members, it sometimes may interfere with one or some of those members, resulting in a failure in the assembling of the rocker arms.

Therefore, an object of the present invention is to provide a highly reliable method of assembling rocker arms in which this kind of failure in assembling can be prevented to the smallest possible degree.

According to the present invention, the foregoing and other objects are attained by a method of assembling rocker arms in which a plurality of holder members are provided in series at a predetermined pitch and in which each of the rocker arms is assembled into a space between the respective holder members, the method comprising the steps of: assembling rocker arm units by respectively inserting into each of the rocker arms a shaft which is longer than a distance between facing side surfaces of two pieces of the adjoining holder members; setting each of the rocker arm units, while holding each of the shafts, into a space between the respective holder members which are provisionally set at a distance which is larger than the predetermined pitch, the setting being made such that each of the shafts coincides with an axis of a bearing hole which is formed in the respective holder members; and narrowing the distance between the respective holder members down to the predetermined pitch to thereby insert end portions of the shafts into the bearing holes.

In the above-described method, the pre-assembled units which are made by rotatably supporting the rocker arms and springs on the shaft are positioned relative to the bearing holes on the basis of both ends of the shafts which project or protrude beyond both ends of the units. Therefore, it is possible to maintain the concentricity of the shafts and the bearing holes, resulting in no failure in assembling.

According to another aspect of the present invention, the method is for assembling rocker arms in which a plurality of holder members are provided in series at a predetermined pitch and in which the rocker arms are rotatably supported by a rocker arm shaft which is rotatably supported through the plurality of holder members. The method comprises the steps of: assembling rocker arm units by respectively inserting into each of the rocker arms a dummy shaft which is longer than a distance between facing side surfaces of two pieces of the adjoining holder members; setting each of the rocker arm units into a space between the respective holder members which are provisionally set at a respective distance which is larger than the predetermined pitch, the setting being made such that the dummy shafts for the rocker arm units coincide with axes of those bearing holes for the rocker arm shafts which are formed in the holder members; narrowing the distance between the respective holder members down to the predetermined pitch to thereby insert end portions of the dummy shafts into the bearing holes; and inserting the rocker arm shaft into the bearing holes from one end of arrangement in series of the holder members to push the dummy shafts out of the other end of the arrangement.

According to this method, by arranging the rocker arms and springs into units by rotatably supporting them on dummy shafts, the concentricity among the members such as the rocker arms, springs, or the like can be secured. Further, by inserting the dummy shafts into the bearing holes, the concentricity of respective members relative to the bearing holes can be secured. Therefore, the rocker arm shaft can be inserted through the plurality of holder members, while pushing out the dummy shafts, without undue efforts and without giving rise to interference with such members as holder members, rocker arms, or the like. The assembling of the rocker arms can thus be carried out surely and smoothly.

According to still another aspect of the present invention, the method is for assembling rocker arms in which a plurality of holder members are provided in series at a predetermined pitch and in which two sets, one being intake side and the other being exhaust side, of rocker arms are assembled into a space between the respective holder members. The method comprises the steps of: assembling first rocker arm units by respectively inserting into one set of rocker arms a first shaft which is longer than a distance between facing side surfaces of two pieces of the adjoining holder members and assembling second rocker arm units by respectively inserting into the other set of rocker arms a second shaft which is longer than the distance; setting each of the first rocker arm units and each of the second rocker arm units into a space between the respective holder members which are provisionally set at a distance which is larger than the predetermined pitch, the setting being made such that the first shafts coincide with axes of those first bearing holes which are formed in the holder members and that the second shafts coincide with axes of those second bearing holes which are formed in the holder members; and narrowing the distance between the respective holder members down to the predetermined pitch to thereby insert end portions of the first shafts and end portions of the second shafts into the first bearing holes and the second bearing holes, respectively.

If, at the above-described step of setting each of the first rocker arm units and each of the second rocker arm units into the space between the respective holder members which are provisionally set, both rocker arm units are held such that the first shafts and the second shafts are grasped at a distance therebetween that is equal to a distance between the first bearing holes and the second bearing holes, and if an arrangement is made such that a length of protrusion of the second shafts beyond the rocker arms of the second rocker arm units becomes longer than a length of protrusion of the first shafts beyond the rocker arms of the first rocker arm units, the second shafts are inserted into the second bearing holes before the first shafts are inserted into the first bearing holes at the above-described step of narrowing the distance between the respective holder members. It follows that the concentricity between the first shafts and the first bearing holes will automatically be secured when the second shafts are inserted into the second bearing holes. Consequently, it is necessary only to secure the concentricity between the second shafts and the second bearing holes. If the end portions of the second shafts are provided with tapers, the tapers will function as guides in inserting the second shafts into the second bearing holes. Therefore, it is not necessary to accurately secure the concentricity between the second shafts and the second bearing holes.

In case one set of rocker arms are rotatably supported by short rocker arm shafts each of which is supported at both ends thereof by two pieces of adjoining holder members, and the other set of rocker arms are supported by a long rocker arm shaft which is supported by inserting it through a plurality of holder members, the first rocker arm units are assembled by using the short rocker arm shafts as the first shaft and the second rocker arm units are assembled by using dummy shafts as the second shaft. After inserting each of the shafts into respective bearing holes in the manner as described above, the long rocker arm shaft is inserted into the second bearing holes from one end of arrangement in series of the holder members to thereby push out the dummy shafts out of the other end of the arrangement.

In case one set of rocker arms and the other set of rocker arms are rotatably supported by long rocker arm shafts which are both penetratingly supported through a plurality of holder members, each of the rocker arm units is respectively assembled using dummy shafts as a first shaft and a second shaft and insert each of the shafts into a respective bearing hole. Then, each of the rocker arm shafts is inserted into the respective bearing hole from one side of arrangement in series of the holder members to thereby push out the dummy shafts as the first and the second shafts out of the other end of the arrangement in series.

BRIEF DESCRIPTION OF THE DRAWINGS

The above and other objects and the attendant advantages of the present invention will become readily apparent by reference to the following detailed description when considered in conjunction with the accompanied drawings wherein:

FIG. 7 is a plan view of a station B;

FIG. 13(a) through FIG. 13(e) are schematic plan views showing the details of the steps of assembling rocker arms;

FIG. 14 is a plan view showing the rocker arms as assembled;

FIG. 17 is a sectional view taken along the line XVII—XVII in FIG. 16;

FIG. 18 is a sectional view taken along the line XVIII—XVIII in FIG. 16; and

FIG. 19(a) through FIG. 19(d) are schematic plan views showing another embodiment of the details of the steps of assembling rocker arms.

DETAILED DESCRIPTION OF PREFERRED EMBODIMENTS

Figure 1:
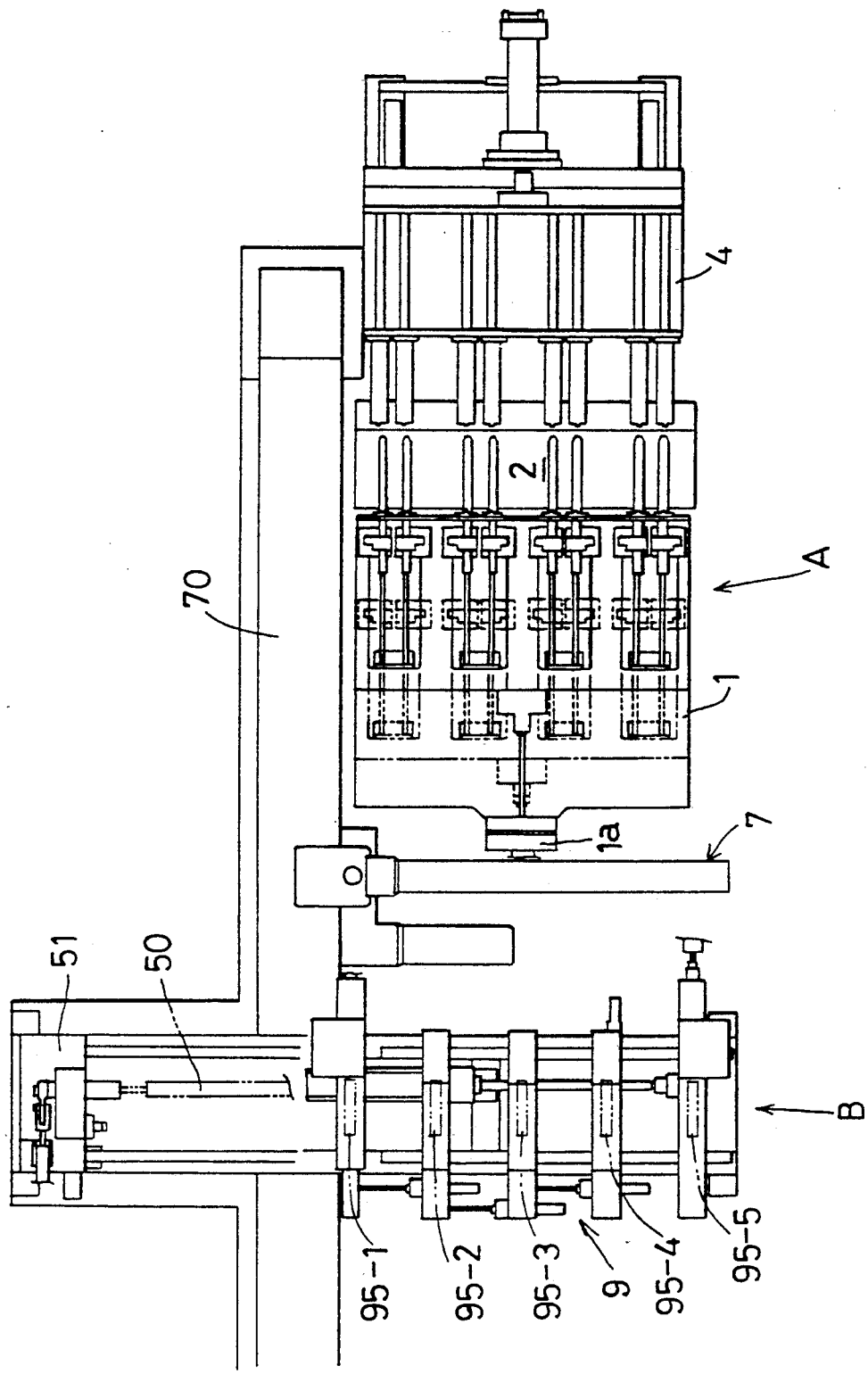
FIG. 1 is a plan view showing the layout of each station.

An explanation will now be made about an embodiment which is applied to the assembling of rocker arms in a so-called 3-cylinder, 1-cam and 4-valve engine.

In this embodiment, the assembled condition of the rocker arms is as shown in FIG. 14. Namely, onto a long rocker arm shaft 50 which is supported over or through first through fifth cam holders 95-1 -95-5, there are assembled in a rotatable or swingable manner exhaust side rocker arms 31 and springs 33 which maintain axial positions of the rocker arms 31. Onto short rocker arm shafts 6, each of which is supported at both ends thereof by two adjoining cam holders, there are similarly assembled in a rotatable or swingable manner intake side rocker arms 32 and wave washers 34 which maintain axial positions of the rocker arms 32. The rocker arm shaft 50 is supported by inserting it into bearing holes 95a-97a which comprise throughgoing or penetrating holes provided in each of the first through the fifth cam holders 95-1 -95-5. The rocker arm shafts 6 are supported by bearing holes 95b-97b which are provided in respective cam holders in a non-throughgoing manner.

In this embodiment, as shown in FIG. 1, there are provided a station A, an assembling station B and a transporting loader 7.

A detailed explanation will now be made hereinbelow about the construction of each station on condition that the direction in which the first through the fifth cam holders 95-1 -95-5 are arranged in series is taken as a front and rear direction (i.e., longitudinal direction).

Figure 2:
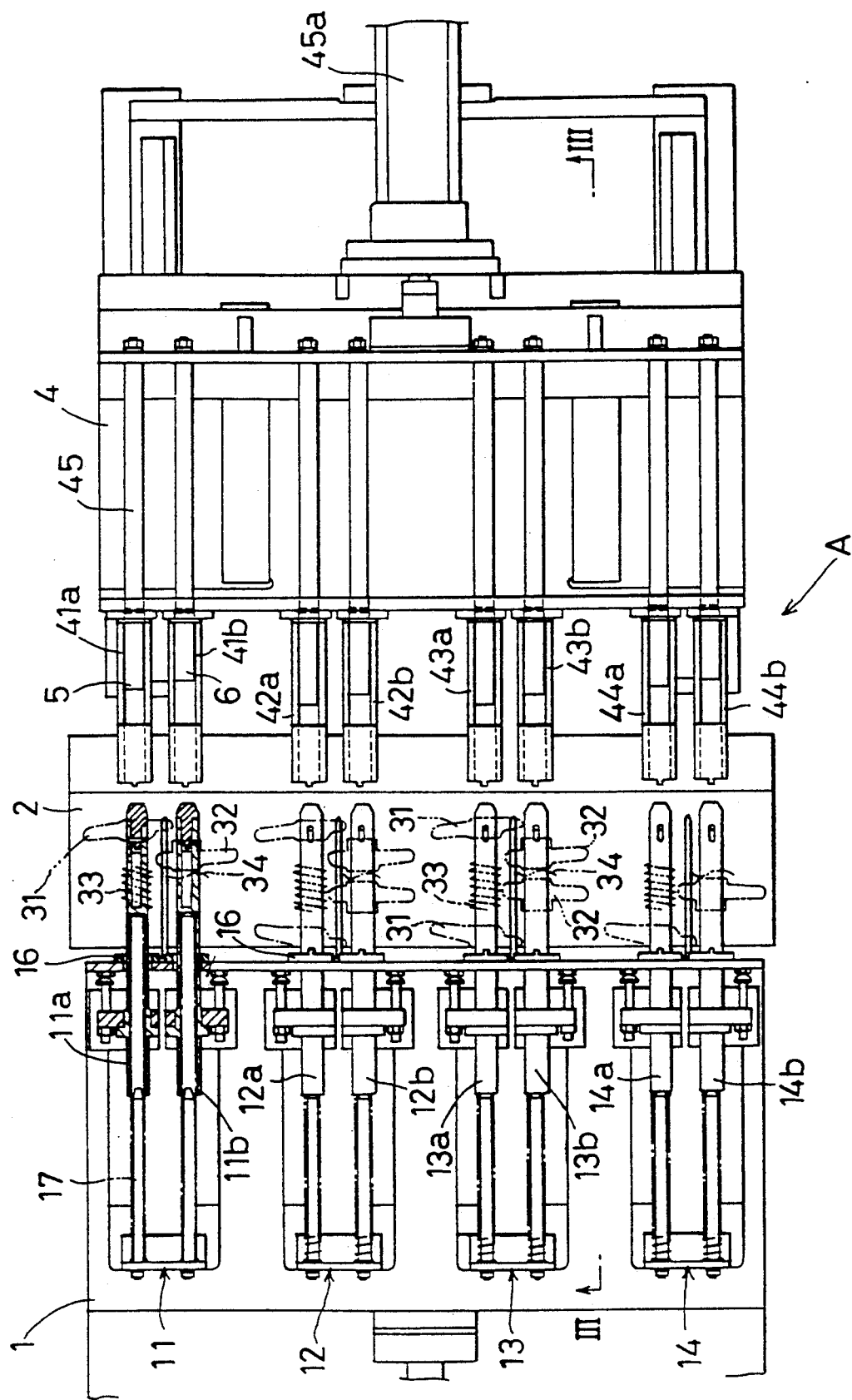
FIG. 2 is a plan view of a station A.
Figure 3:
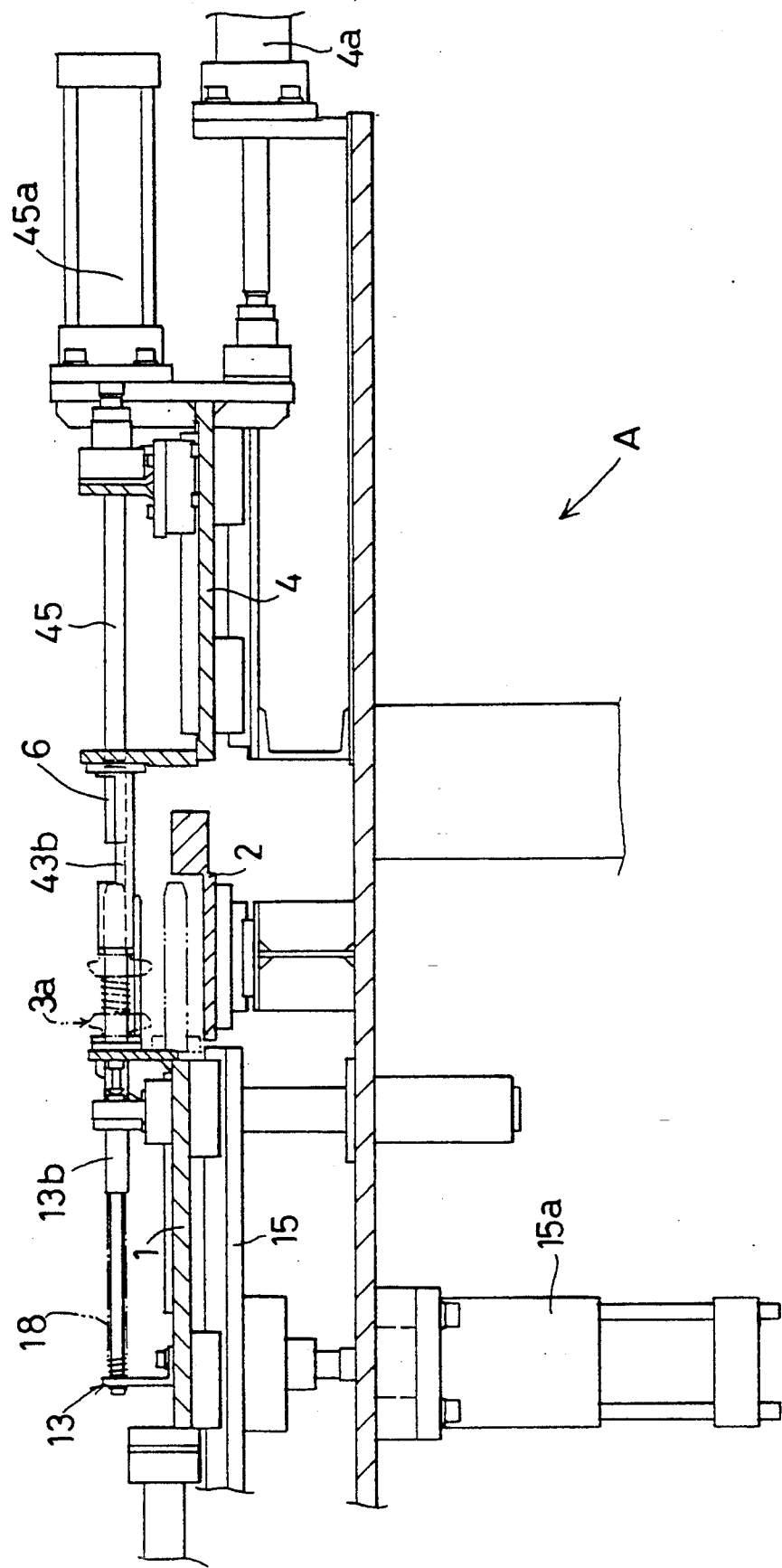
FIG. 3 is a sectional view taken along the line III—III in FIG. 2.

In the above-described station A, there is provided, as shown in FIGS. 2 and 3, a pallet 2 which is for setting the rocker arms and can be withdrawn towards the front direction. On both lateral sides of the pallet 2, there are disposed in an opposing manner a first sliding table 1 and a second sliding table 4, both of which are laterally movable back and forth. On the pallet 2 there are provided in series rocker arm mounting portions for three cylinders respectively with a space in the front and rear direction. In each of the rocker arm mounting portions there are laterally set, in a roughly aligned manner, exhaust side rocker arm or arms 31 and an intermediate spring 33, both of which are to be assembled into the space between respective cam holders. Intake side rocker arm or arms 32 and an intermediate wave washer 34 are also laterally set in a roughly aligned manner in close proximity, in the front and rear direction, to the above-described exhaust side rocker arm or arms 31.

Figure 4:
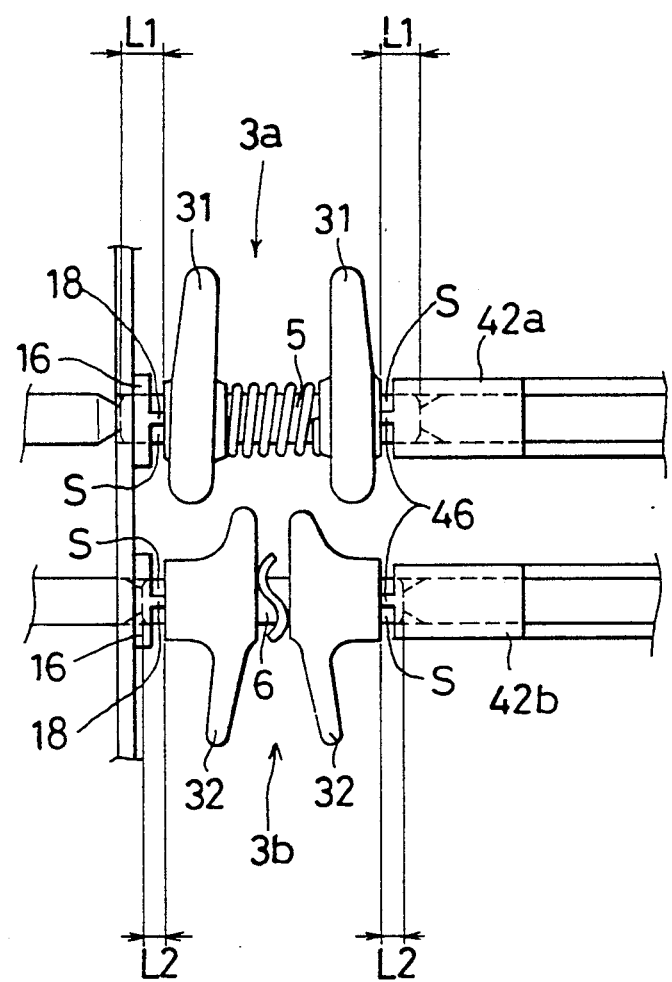
FIG. 4 is a detail of rocker arm units as assembled.

On the first sliding table 1 there are disposed four pieces of workpiece pick up portions 11-14 which are arranged in series, in the front and rear direction, in positions corresponding to the mounting portions in the table 2. Further, the first sliding table 1 is supported on a lifting frame 15 which is movable up and down by a cylinder 15a, such that the sliding table 1 can be moved laterally back and forth by a cylinder 1a. On the workpiece pick up portions 11-14 there are mounted four pairs of rods 11a, 11b through 14a, 14b which are so formed as to be largely tapered at their front ends (i.e., ends on the side of the pallet 2). The respective pairs of rods 11a, 11b-14a, 14b are projectingly urged by springs 17 inwards through each bush 16 mounted on an internal edge of the first sliding table 1. When the first sliding table 1 is moved forwards (i.e., in a direction towards the pallet 2), each of the rods 11a-14a is inserted into the rocker arm or arms 31 and the spring 33 on each of the above-described mounting portions. Each of the rods 11b-14b is similarly inserted into the above-described rocker arm or arms 32 and the wave washer 34. Subsequently, when the first sliding table 1 is moved up by the operation of the cylinder 15a, these rocker arms 31, 32, springs 33 and wave washers 34 are picked up out of the pallet 2 in a condition in which the rods 11a-14a and 11b-14b are inserted therethrough. Since the front end of each of the rods 11a-14a and 11b -14b is largely tapered, the rocker arms 31, 32, springs 33 and wave washers 34 can surely be picked up even if their positions on the pallet 2 may be deviated to a certain degree. On the second sliding table 4, on the other hand, there are fixedly provided four pairs of pushers 41a-14a and 41b-44b which are in positions to axially correspond to or face the rods 11a-14a and 11b-14b at the lifted end position of the first sliding table 1. At the front ends (i.e., ends on the side of the pallet 2) of the pushers 41a-44a and 41b-44b there are provided holes into which the rods 11a-14a and 11b-14b can be inserted respectively. When the second sliding table 4 is moved forwards (i.e., in a direction towards the pallet 2) by a cylinder 4a in a condition in which the first sliding table 1 is in its lifted end position, the rocker arms 31, 32, springs 33 and wave washers 34 are moved along respective rods 11a-14a and 11b-14b by the push from each of the pushers 41a-44a and 41b-44b. As a consequence, they are contracted or moved closer to each other in the axial direction down to a predetermined dimension or distance by being urged towards the side of the first sliding table 1. A dummy shaft 5 is respectively placed or mounted inside each of the pushers 41a-44a. Similarly, a rocker arm shaft 6 is respectively placed or mounted inside each of the pushers 41b-44b. Further, by four pairs of pushing rods 45 which are provided on the second sliding table 4 so as to be movable back and forth by a cylinder 45a, the dummy shafts 5 and the rocker arm shafts 6 are pushed out towards the first sliding table 1. Then, each of the shafts 5, 6 come into abutment with the respective rods 11a-14a and 11b -14b, and the rods 11a-14a and 11b-14b are pushed by the shafts 5, 6 to move backwards (i.e., in a direction away from the pallet 2) against the urging force of the springs 17. As a consequence, the dummy shafts 5 are inserted into the respective exhaust side rocker arms 31 and springs 33 to thereby form or assemble exhaust side rocker arm units 3a. At the same time, the rocker arm shafts 6 are inserted into the respective intake side rocker arms 32 and wave washers 34 to thereby form or assemble intake side rocker arm units 3b. The length of each dummy shaft 5 is arranged, as shown in FIG. 4, such that, in an assembled condition of each rocker arm unit 3a, 3b, the length L1 of projection or protrusion of each dummy shaft 5 beyond the rocker arms 31 on both sides is slightly longer than the length L2 of projection or protrusion of each rocker arm shaft 6 beyond the rocker arms 32 on both sides. Further, small projections 18, 46 which abut the respective rocker arms are formed in each of the bushes 16 mounted on the first sliding table 1 and each of the pushers 41a, 41b-44a, 44b. It is thus so arranged that a space S can be secured for holding or grasping the shafts 5, 6 with those clamping pieces 81 of the loader 7 which are to be described later.

Figure 5:
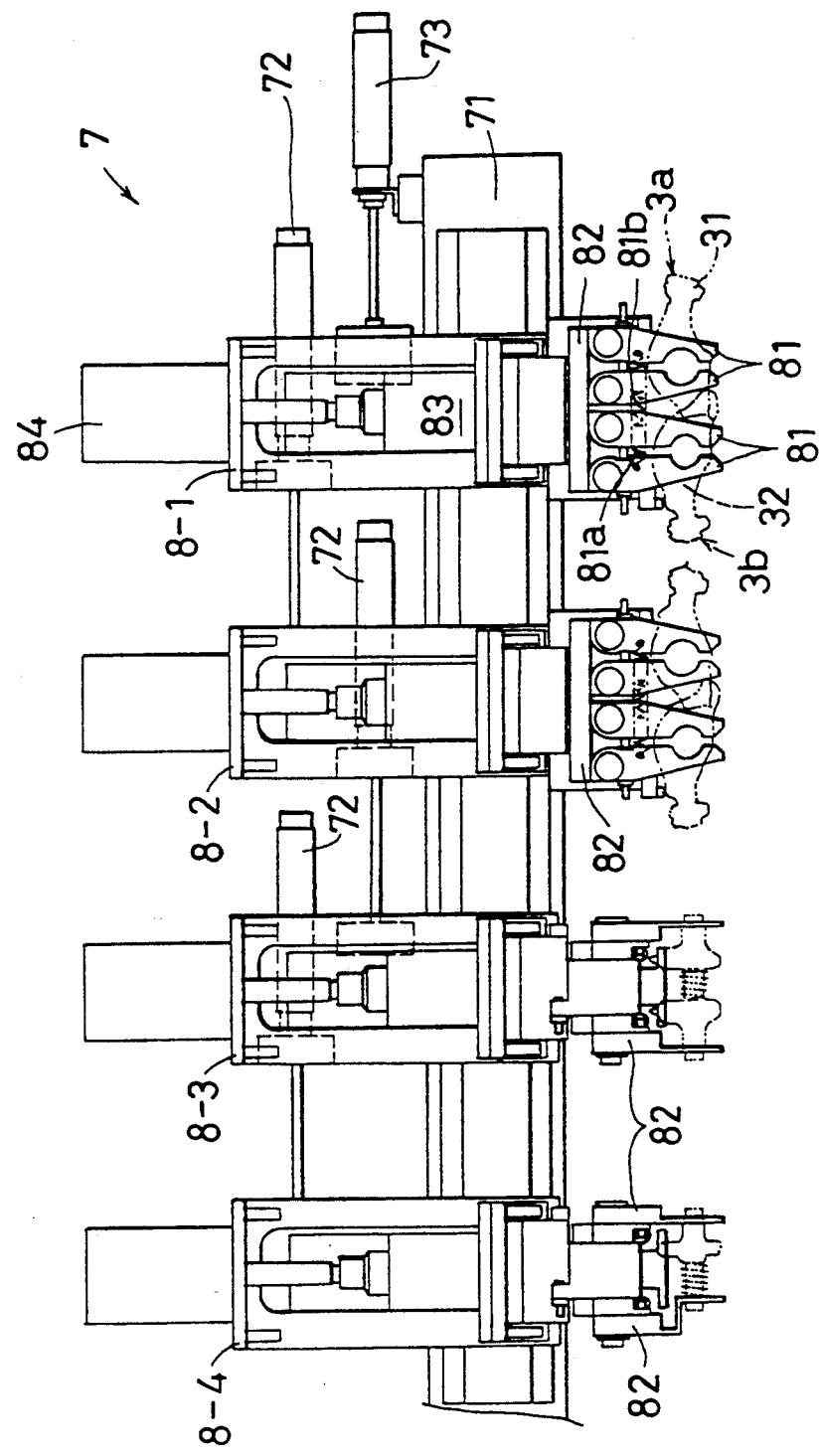
FIG. 5 is a front view of a loader.
Figure 6:
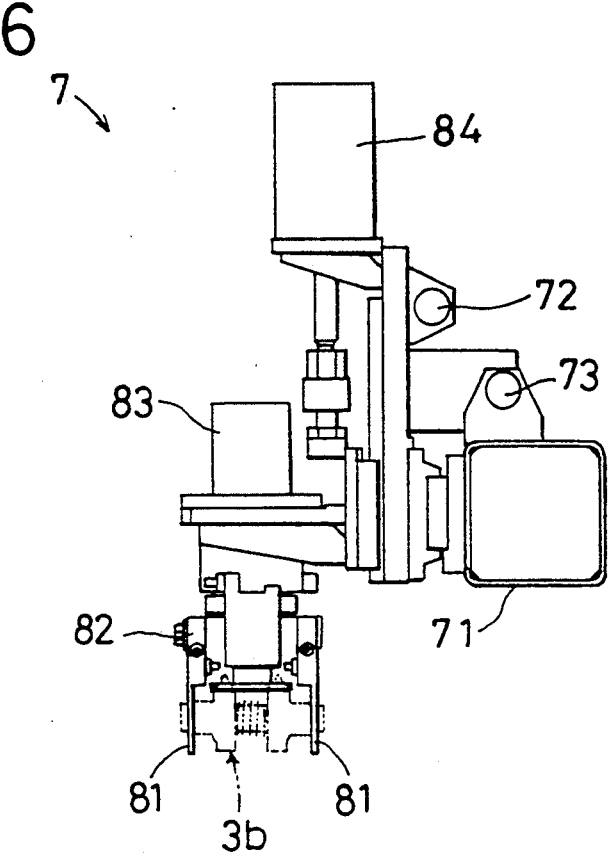
FIG. 6 is a side view of the loader.

The above-described loader 7 is provided with an elongated arm 71 which extends in the front and rear direction and is movable back and forth along a guide frame 70 which is disposed to extend across the stations A and B. As shown in FIGS. 5 and 6, first through fourth loader units 8-1 -8-4 are supported on the arm 71 so as to be slidable in the front and rear direction. The loader units 8-1 -8-4 are connected to each other by respective cylinders 72. The loader unit 8-1 which is located in the rearmost end of the arrangement in series is connected to the arm 71 via a cylinder 73.

In each of the loader units 8-1-8-4 there is provided a chuck 82 which holds the exhaust side and the intake side rocker arm units 3a, 3b, such that the chuck 82 is movable up and down by a cylinder 84 and is rotatable by 90 degrees by an air motor 83. Each of the chucks 82 is provided, at a distance in the axial direction of the shafts 5, 6, with two pairs of clamping pieces 81 which hold or grasp the exhaust side and the intake side rocker arm units 3a, 3b at their respective shafts 5, 6. Among the two pairs of clamping pieces 81 in each set, two pieces on the outer side are urged inwards respectively by a spring 81a, and the two pieces on the inner side are urged outwards by a spring 81b provided in a compressed manner between the two. The shafts 5, 6 are thus arranged to be held by the urging forces of these springs 81a, 81b. Each of the chucks 82 is provided with a downward compliance (i.e., a function to absorb eccentricity or deviation in position or angle in a downward direction) by urging it upwards by an unillustrated spring.

When the provisional assembly or half-assembly of each rocker arm unit 3a, 3b has been finished in the above-described station A, the chuck 82 of each rocker arm unit 8-1-8-4 is lowered to, first, cause the lower ends of the clamping pieces 81 to abut both ends of each shaft 5, 6. By further lowering the chuck 82, respective clamping pieces 81 are swung against the urging forces of the springs 81a, 81b to open to thereby clamp each shaft 5, 6. As a result, the exhaust side and the intake side rocker arm units 3a, 3b for respective cylinders are held by each loader unit while maintaining a predetermined relative positional relationship. Once each shaft 5, 6 is thus clamped, the first and the second sliding tables 1, 4 are both retreated laterally outwards and thereafter each chuck 82 is lifted. Then, each chuck 82 is rotated 90 degrees by the air motor 83 so that the dummy shafts 5 and the rocker arm shafts 6 both being held by the respective chucks 82 coincide, within respective groups, with each common axial line which extends in the front and rear direction. In FIG. 5 the loader units 8-1-8-2 are shown to be in a condition before rotation and the loader units 8-3-8-4 are shown to be in a condition after rotation.

In the station B, as shown in FIG. 1, there are provided in a front portion thereof an assembling table 9 and in a rear portion thereof a shaft inserting frame 51 which is slidable in the front and rear direction. A rocker arm shaft 50 is held on the shaft inserting frame 51.

Figure 8:
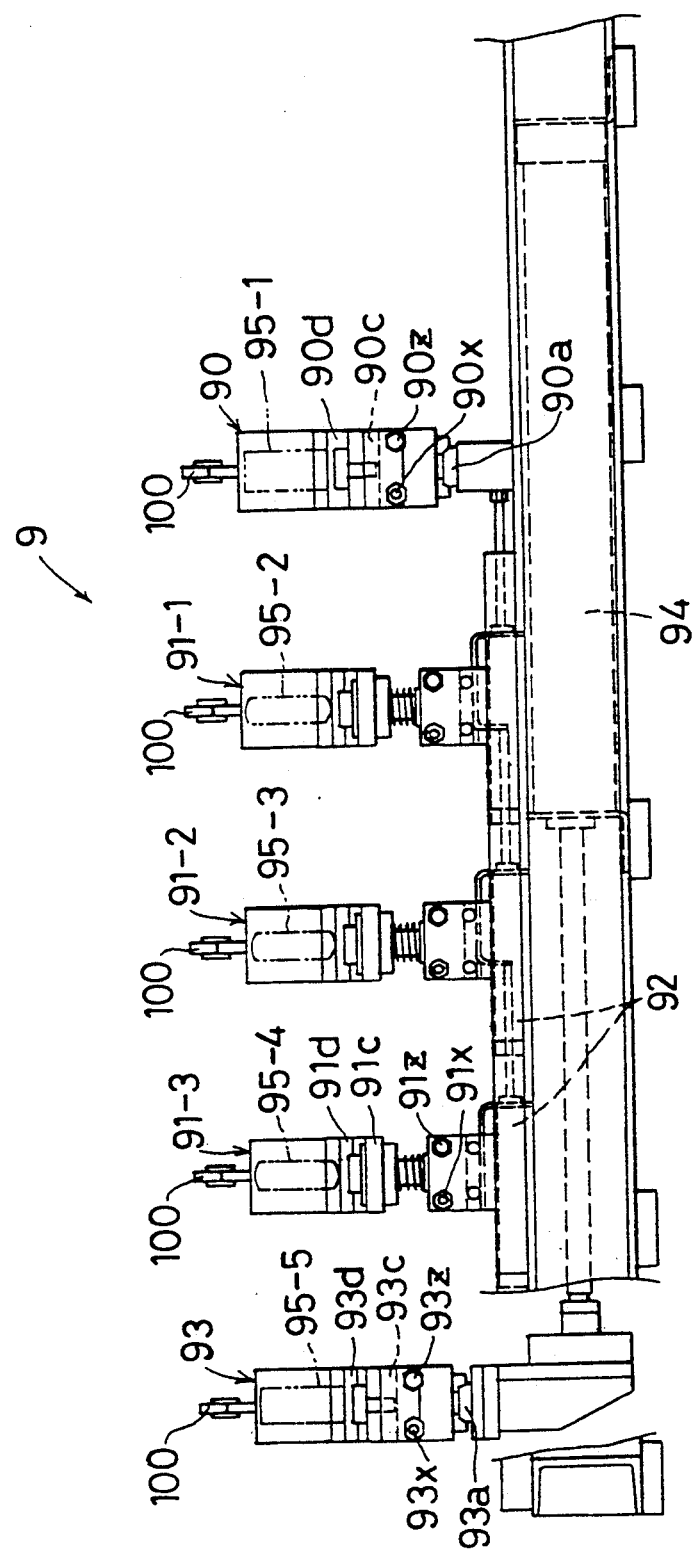
FIG. 8 is a front view of the station B.
Figure 9:
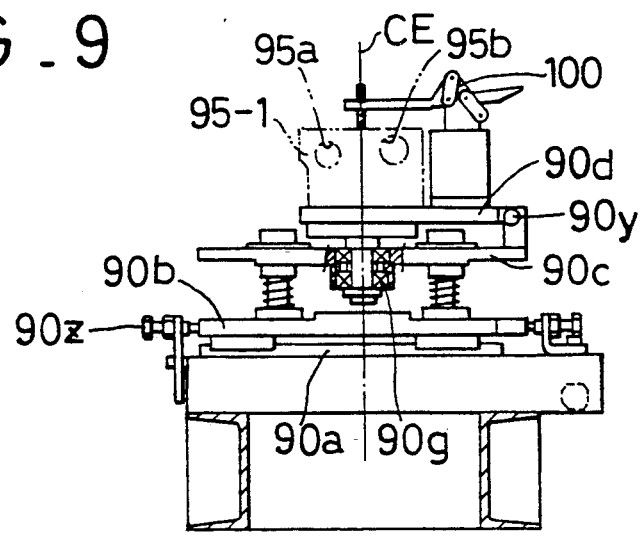
FIG. 9 is a sectional view taken along the line IX—IX in FIG. 7.

As shown in FIGS. 7 and 8, the assembling table 9 is provided at its rear end with a stationary frame 90 for setting thereon the first cam holder 95-1. From this stationary frame 90 towards the front end, there are mounted in sequence first through fourth sliding frames 91-1 -91-3 as well as a pressing frame 93 for setting, respectively, the second through the fourth cam holders 95-2 -95-4 as well as the fifth cam holder 95-5, such that they are slidable in the front and rear direction. The sliding frames 91-1 -91-3 are connected in series to the stationary frame 90 in a sequential manner via cylinders 92. The pressing frame 93 is directly connected to the assembling table 9 via a larger cylinder 94. The stationary frame 90 is provided, as shown in FIG. 9, with a first base plate 90b which is slidable along a laterally elongated rail 90a. On this first base plate 90b there is mounted a second base plate 90c which is provided with a downward compliance by being urged upwards. Further, there is mounted on the second base plate 90c a third base plate 90d which is supported by a bearing 90g so as to be rotatable about a vertical axial line CE. Since the third base plate 90d is held at its one end in a pinched manner by a pair of spring pins 90y, it is held in a neutral position relative to the direction of rotation, and a compliance is provided in both directions of rotation. The first base plate 90b is held in a pinched manner by a pair of spring pins 90x which are provided on both sides, in the sliding direction, of the first base plate 90b. It is therefore provided with a compliance in the sliding direction relative to the pinchingly held position, i.e., in the lateral direction. In order to restrict the range of movements by the lateral compliance, there are provided a pair of stoppers 90z at a predetermined clearance to the first base plate 90b.

Figure 10:
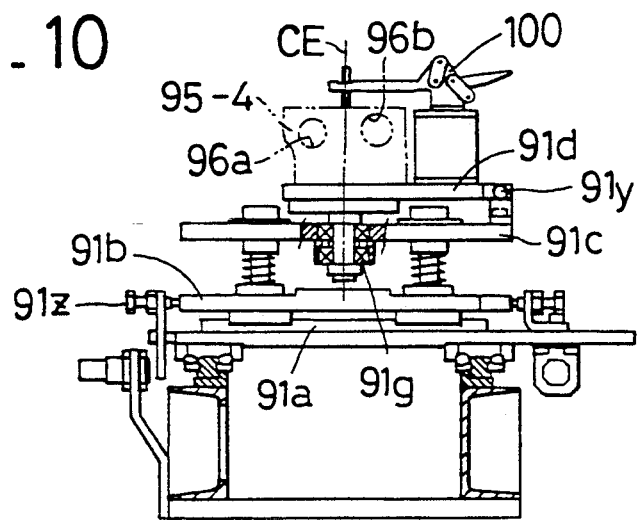
FIG. 10 is a sectional view taken along the line X—X in FIG. 7.
Figure 11:
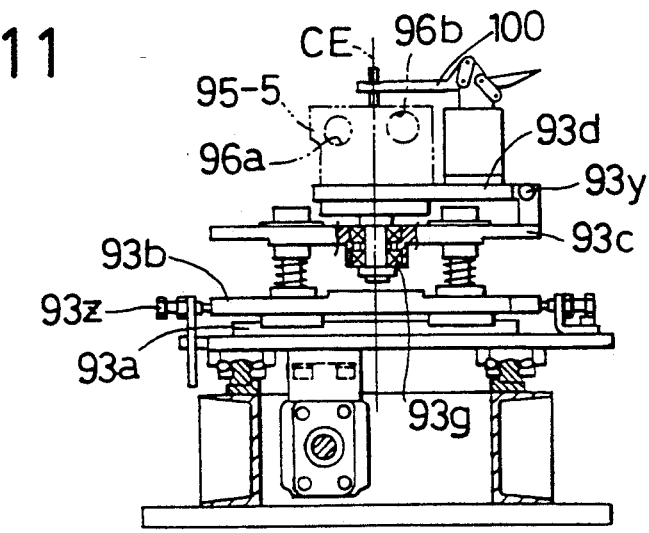
FIG. 11 is a sectional view taken along the line XI—XI in FIG. 7.

As shown in FIGS. 10 and 11, there are mounted on the sliding frames 91-1 -91-3 as well as the pressing frame 93, first base plates 91b, 93b which are respectively slidable along rails 91a, 93a which are elongated in the lateral direction. On the first base plates 91b, 93b there are provided second base plates 91c, 93c which have downward compliances and third base plates 91d, 93d which are held by bearings 91g, 93g so as to be rotatable about a vertical axis CE and which have compliances by spring pins 91y, 93y in the direction of rotation. Each of the first base plates 91b, 93b of the sliding frames 91-1 -91-3 and the pressing frame 93 is provided with a lateral compliance by means of a pair of spring pins 91x, 93x which are respectively positioned on both sides, in the sliding direction, of the base plates, and is further restricted in the amount of lateral compliance by means of stoppers 91z, 93z which are set in a pair at a predetermined clearance to both lateral sides of the first base plates 91b, 93b. Further, the first and the fifth cam holders 95-1, 95-5 are clamped to the third base plates 90d, 93d of the stationary frame 90 and the pressing frame 93 respectively, and the second through the fourth cam holders 95-2 -95-4 are clamped respectively to the third base plate 91d of the three pieces of sliding frames 91-1 -91-3 by means of respective clamping devices 100. The exhaust side bearing holes 95a -97a of the cam holders 95-1 -95-5 and the intake side bearing holes 95b-97b thereof are respectively positioned to be aligned, within respective groups, with each common axial line of the bearing holes.

Figure 12:
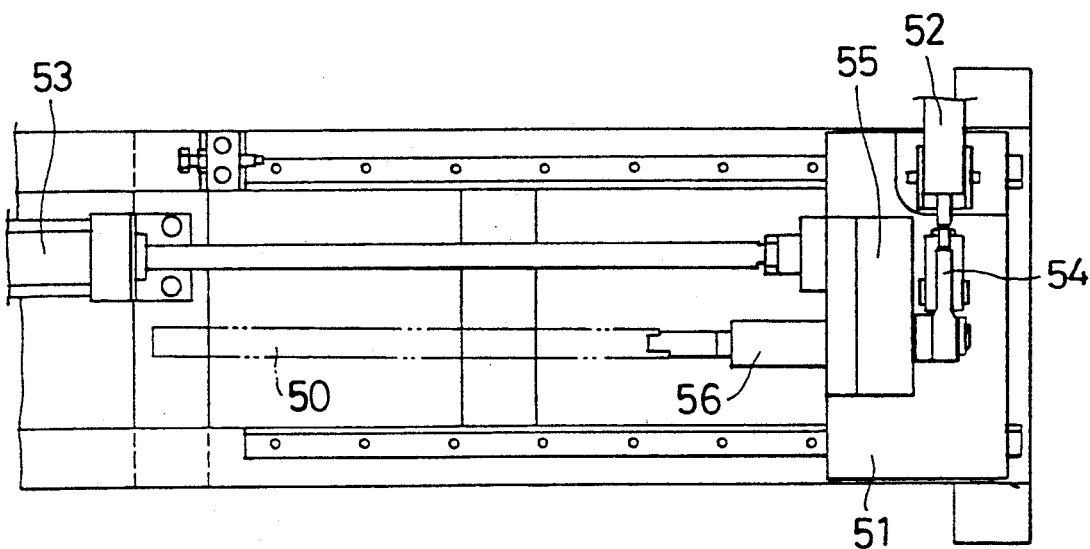
FIG. 12 is a plan view showing a condition in which a rocker arm is in a waiting position.

The shaft inserting frame 51 is moved back and forth, as shown in FIG. 12, by a cylinder 53 towards and away from the assembling table 9. On the shaft inserting frame 51 there is mounted a gear box 55 which interlocks a lever 54 to be swung or rotated by a cylinder 52 and a holding portion 56 to hold the rocker arm shaft 50. It is thus so arranged that, by the forward and backward or reciprocating movement of the cylinder 52, the rocker arm shaft 50 can be swung or rotated about its central axial line.

Next, an explanation will now be made about the working procedures in the station B.

First, each chuck 82 which holds each of the above-described rocker arm units 3a, 3b is lowered into the respective space between the first through the fifth cam holders 95-1 –95-5 to make the common axial lines of the shafts 5, 6 coincide with the common axial lines of the bearing holes, respectively (FIG. 13(a)). Then, by operating the cylinders 72 of the loader 7 and the cylinders 92, 94 of the assembling table 9, each of the loader units 8-1 –8-4 is shifted in the horizontal rearward direction (i.e., upward direction as seen in FIG. 1), and the sliding frames 91-1 –91-3 and the pressing frame 93 are also horizontally shifted towards the stationary frame 90 to first insert the ends of the dummy shafts 5 into the bearing holes 95a–97a. At this time, even if the axis of each bearing hole and the axial line of each shaft may not be aligned to each other, the first through the fifth cam holders 95-1 –95-5 are corrected in their positions through their compliances by the insertion of the ends of the dummy shafts 5 into the bearing holes 95a–97a. By this operation, the ends of the rocker arm shafts 6 which are held by the chucks 82 in a predetermined relative positional relationship with the dummy shafts 5 are inserted smoothly into the bearing hole 95b–97b (FIG. 13(b)). If both ends of the dummy shafts 5 are tapered, these tapered portions will function as guides, so that the dummy shafts 5 can surely be inserted into the bearing holes even if there may be some positioning errors by the loader 7.

Then, the chucks 82 of the four pieces of loader units 8-1 –8-4 are detached upwards. The distances between the respective cam holders are further narrowed to compensate for the thicknesses corresponding to those clamping pieces 81 of the chucks 82 which have just been removed (FIG. 13(c)). Thereafter, while the rocker arm shaft 50 is rotated about the axial line by the operation of the cylinder 52, the shaft inserting frame 51 is shifted towards the assembling table 9 by the operation of the cylinder 53 to thereby insert the rocker arm shaft 50 into the bearing holes 95a–97a (FIG. 13(d)). Each dummy shaft 5 is consequently pushed out, thereby completing the assembling of the rocker arms (FIG. 13(e)).

In the above-described embodiment only the intake side rocker arms 32 are arranged to be rotatably supported by short rocker arm shafts 6. However, in case the exhaust side rocker arms 31 are also rotatably supported by short rocker arm shafts, short rocker arm shafts are used instead of dummy shafts 5 to thereby assemble the exhaust side rocker arm units. Then, the assembling of the rocker arms is carried out in the procedures as shown in the above-described FIG. 13(a) through FIG. 13(c).

Figure 15:
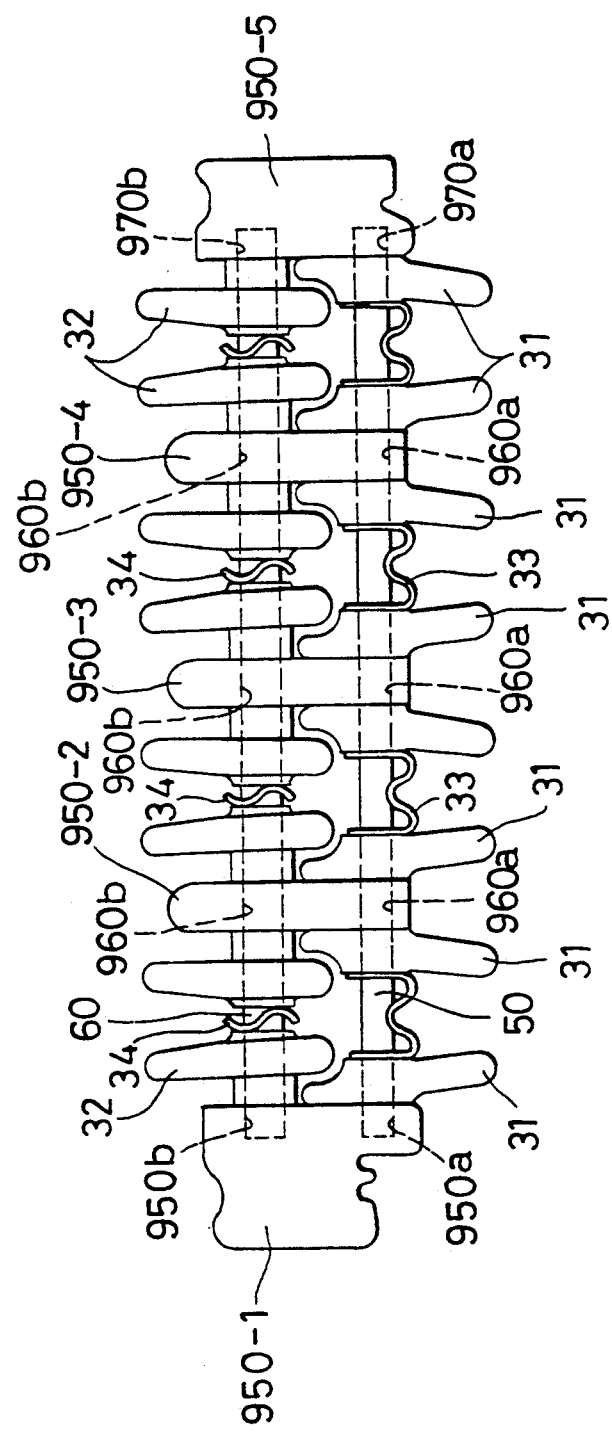
FIG. 15 is a plan view showing another embodiment of the rocker arms as assembled.

In the following, an explanation will now be made about another embodiment as represented in FIG. 15. The rocker arms in this Figure is made up of the following members. Namely, there are used, in both the exhaust side and the intake side, long rocker arm shafts 50, 60 which are supported in a penetrating manner over or throughout the second through the fourth cam holders 950-2 –950-4. In each space between the respective cam holders there are assembled exhaust side rocker arms 31 and a spring 33 for maintaining the axial positions of the rocker arms 31, both being rotatably supported by a rocker arm shaft 50. In each space between the respective cam holders there are also assembled intake side rocker arms 32 and a wave washer 34 for maintaining the axial positions of the rocker arms 32, both being rotatably supported by a rocker arm shaft 60. In the assembling of this kind of rocker arms, both the exhaust side rocker arm units and the intake side rocker arm units are assembled respectively using dummy shafts 5, 6, and they are then assembled into the spaces between respective cam holders in a manner to be described hereinbelow. The rocker arm shafts 50, 60 are penetratingly supported by bearing holes 960a, 960b comprising a pair of throughgoing holes which are formed in each of the second through the fourth cam holders 950-2 –950-4. The rocker arm shafts 50, 60 are also supported by a pair of non-penetrating bearing holes 950a, 950b and 970a, 970b which are respectively formed in the opposing surfaces of the first and the fifth cam holders 950-1, 950-5 so as to restrict the axial positions of the rocker arm shafts 50, 60.

Figure 16:
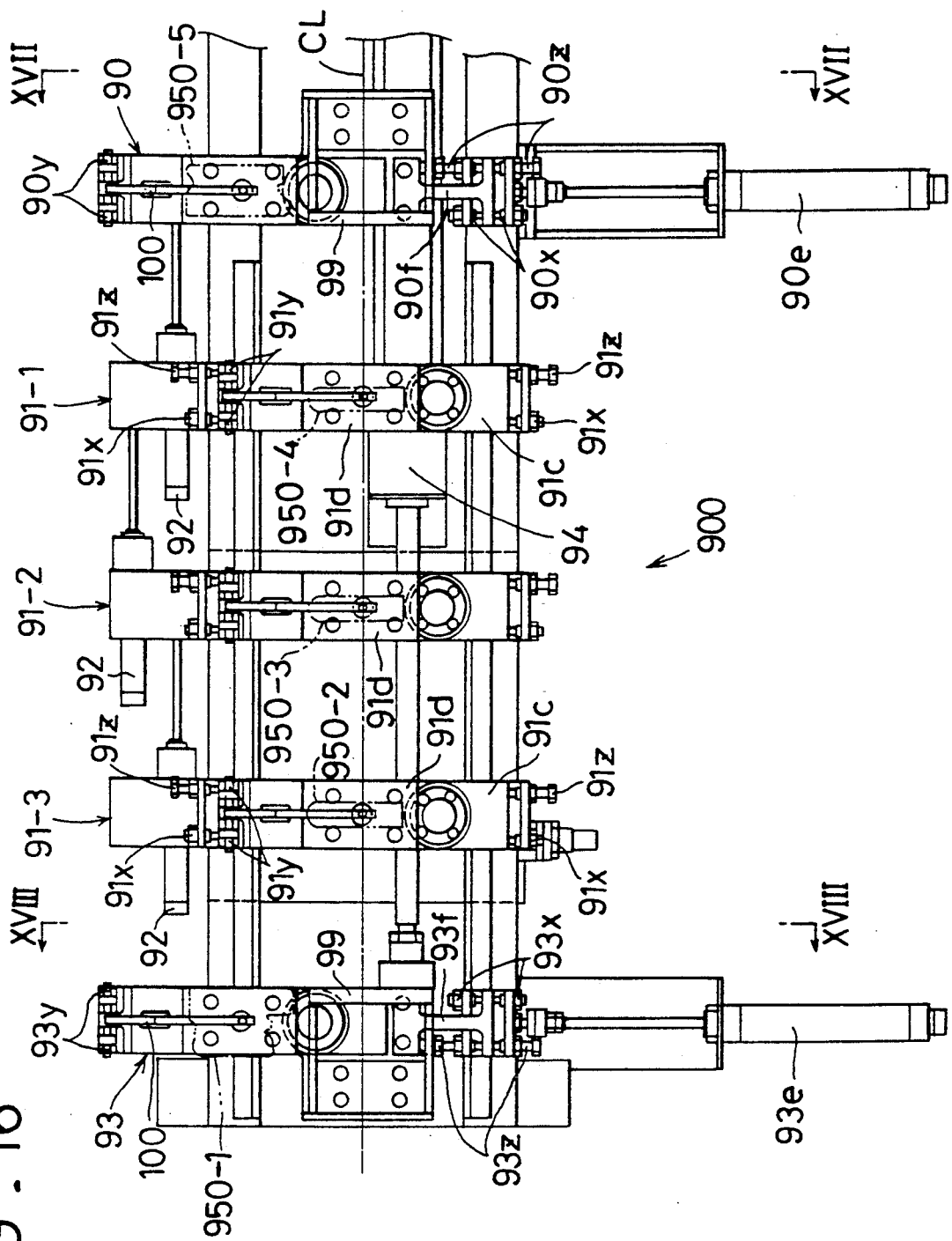
FIG. 16 is a plan view of another embodiment of station B.

An assembling table 900 to be used in the assembling of the above-described rocker arms is as shown in FIG. 16. As compared with that shown in FIG. 7, there are the following differences (The same reference numerals as in FIG. 7 are used in FIG. 16 and others for the same members). Namely, as shown in FIGS. 17 and 18, the first base plate 90b, 93b of the stationary frame 90 and the pressing frame 93 are made to be laterally movable back and forth by cylinders 90e, 93e via sliders (or sliding members) on rails 90a, 93a and connecting pieces 90f, 93f. The connecting pieces 90f, 93f are provided with compliances by respective pair of spring pins 90x, 93x and are also arranged so as not to give rise to compliances beyond a predetermined amount by being pinched by respective pair of stoppers 90z, 93z. On the first base plates 90a of the stationary frame 90 and on the first base plate 93b of the pressing frame 93, there are provided a pressing piece 99, respectively, in a manner opposing to each other in the front and rear direction. On those surfaces of the pressing pieces 99 which face each other, there is respectively provided a horizontally elongated window 99a which respectively opens into the side of the third base plates 90d, 93d. Further, there is respectively provided a clamping device 100 on the third base plates 90d, 93d so as to hold the cam holders 950-1, 950-5. On the intermediate three pieces of third base plates 91d, there are clamped the respective cam holders 950-2 –950-4 so as to be positioned in a common axial line together with the bearing holes 960a, 960b. On the shaft inserting frame 51 there are supported two pieces of rocker arm shafts 50, 60 in parallel with each other and at a distance corresponding to that of the bearing holes 960a, 960b.

The assembling procedures of this embodiment will now be explained with reference to FIG. 19. One of the dummy shafts 5 for the exhaust side rocker arm units and the dummy shafts 6 for the intake side rocker arm units are made such that the length of projection or protrusion of the dummy shafts 5, for example, beyond the rocker arms is made longer than that of the dummy shafts 6. First, each chuck 82 which holds each of the above-described rocker arm units is lowered into the respective space between the pressing pieces 99 and the cam holders 950-2 –950-4 to make the common axial lines of the dummy shafts 5, 6 coincide with the common axial lines of the bearing holes 960a, 960b, respectively (FIG. 19(a)). Then, by operating the cylinders 72 of the loader 7 and the cylinders 92, 94 of the assembling table 900, each of the loader units 8-1 -8-4 is shifted in the horizontal rearward direction, and the sliding frames 91-1 -91-3 as well as the pressing frame 93 are also horizontally shifted towards the stationary frame 90 to first insert the ends of the dummy shafts 5 into the bearing holes 960a. At this time, even if the axis of each bearing hole 960a, 960b and the axial line of each dummy shaft 5, 6 may not be aligned to each other, the cam holders 950-2 -950-4 are corrected in their positions through their compliances by the insertion of the ends of the dummy shafts 5 into the bearing holes 960a. By this operation, the ends of the dummy shafts 6 which are held by the chucks 82 in a predetermined relative positional relationship with the dummy shafts 5 are inserted smoothly into the bearing holes 960b (FIG. 19(b)). If both ends of at least the dummy shafts 5 are tapered, these tapered portions will function as guides, so that the dummy shafts 5 can surely be inserted into the bearing holes even if there may be some positioning errors by the loader 7.

Then, the chucks 82 of the two pieces of the inner side loader units 8-2 -8-3 are detached upwards. The distances between the respective cam holders 950-2 -950-4 are further narrowed to compensate for the thicknesses corresponding to those clamping pieces 81 of the two pieces of chucks 82 which have just been removed. Thereafter, while rotating about their axial lines, the rocker arm shafts 50, 60 are inserted into the respective bearing holes 960a, 960b to thereby push out the dummy shafts 5, 6 (FIG. 19 (c); pushed out dummy shafts are not illustrated). Then, the first base plates 90b, 93b of the stationary frame 90 and the pressing frame 93 are retreated or moved laterally to release the ends of the rocker arm shafts 50, 60 out of engagement with the respective windows 99a formed in the pressing pieces 99. Instead of the pressing pieces 99, the first and the fifth cam holders 950-1, 950-5 are made to be aligned relative to the center line CL (FIG. 19(d)). Then, each of the first through the fourth cam holders 950-1 - 950-4 is further moved towards the fifth cam holder 950-5 to cause both ends of each rocker arm shaft 50, 60 to be inserted into each of the bearing holes 950a, 950b and 970a, 970b. Subsequently, the chucks 82 of the two pieces of outer loader units 8-1, 8-4 are moved upwards and then the clearances corresponding to the clamping pieces 81 which have just been removed are narrowed, thereby completing the assembling of the rocker arms.

It is readily apparent that the above-described methods of assembling rocker arms meet all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of assembling rocker arms in which a plurality of holder members are provided in series at a predetermined pitch and in which each of said rocker arms is assembled into a space between said respective holder members, said method comprising the steps of:

assembling rocker arm units by respectively inserting into each of said rocker arms a shaft which is longer than a distance between facing side surfaces of two adjoining pieces of said holder members;

setting each of said rocker arm units, while holding each of said shafts, into a space between said respective holder members which are provisionally set at a respective distance which is larger than said predetermined pitch, said setting being such that each of said shafts coincides with an axis of a bearing hole which is formed in each of said holder members; and narrowing said distance between said respective holder members down to said predetermined pitch to thereby insert end portions of said shafts into said bearing holes.

2. A method of assembling rocker arms in which a plurality of holder members are provided in series at a predetermined pitch and in which said rocker arms are rotatably supported by a rocker arm shaft which is rotatably supported through said plurality of holder members, said method comprising the steps of:

assembling rocker arm units by respectively inserting into each of said rocker arms a dummy shaft which is longer than a distance between facing side surfaces of two adjoining pieces of said holder members;

setting each of said rocker arm units into a space between said respective holder members which are provisionally set at a respective distance which is larger than said predetermined pitch, said setting being such that said dummy shafts for said rocker arm units coincide with axes of those bearing holes for said rocker arm shafts which are formed in said holder members;

narrowing said distance between said respective holder members down to said predetermined pitch to thereby insert end portions of said dummy shafts into said bearing holes; and inserting said rocker arm shaft into said bearing holes from one end of arrangement in series of said holder members to push said dummy shafts out of the other end of said arrangement.

3. A method of assembling rocker arms in which a plurality of holder members are provided in series at a predetermined pitch and in which two sets of rocker arms, one being intake side and the other being exhaust side, are assembled into a space between said respective holder members, said method comprising the steps of:

assembling first rocker arm units by respectively inserting into one set of rocker arms a first shaft which is longer than a distance between facing side surfaces of two pieces of said adjoining holder members and assembling second rocker arm units by respectively inserting into the other set of rocker arms a second shaft which is longer than said distance;

setting each of said first rocker arm units and each of said second rocker arm units into a space between said respective holder members which are provisionally set at a distance which is larger than said predetermined pitch, said setting being made such that said first shafts coincide with axes of those first bearing holes which are formed in said holder members and that said second shafts coincide with axes of those second bearing holes which are formed in said holder members; and narrowing said distance between said respective holder members down to said predetermined pitch to thereby insert end portions of said first shafts and end portions of said second shafts into said first bearing holes and said second bearing holes, respectively.

4. A method of assembling rocker arms according to claim 3, further comprising the steps of:

at the above-described step of setting each of said first rocker arm units and each of said second rocker arm units into said space between said respective holder members which are provisionally set, holding together said both rocker arms such that said first shafts and said second shafts are grasped at a distance therebetween that is equal to a distance between said first bearing holes and said second bearing holes; and arranging such that a length of protrusion of said second shafts beyond said rocker arms of said second rocker arm units becomes longer than a length of protrusion of said first shafts beyond said rocker arms of said first rocker arm units, whereby, at the above-described step of narrowing said distance between said respective holder members, said second shafts are inserted into said second bearing holes before said first shafts are inserted into said first bearing holes.

5. A method of assembling rocker arms according to claim 4, wherein said second shafts are provided at end portions thereof with tapers so as to cause said tapers to function as guides in inserting said second shafts into said second bearing holes.

6. A method of assembling rocker arms in which a plurality of holder members are provided in series at a predetermined pitch and in which two sets of rocker arms, one being intake side and the other being exhaust side, are rotatably supported by shot rocker arm shafts and a long rocker arm shaft, respectively, each of said short rocker arm shafts for one set of rocker arms being supported at both ends thereof by two adjoining pieces of holder members, said long rocker arm shaft for the other set of rocker arms being supported by inserting it through said plurality of holder members, said method comprising the steps of:

assembling first rocker arm units by inserting said short rocker arm shafts through said one set of rocker arms and assembling second rocker arm units by inserting dummy shafts into the other set of rocker arms, each of said dummy shafts being longer than a distance between facing side surfaces of two said adjoining pieces holder members;

setting each of said first rocker arm units and each of said second rocker arm units into a space between said respective holder members which are provisionally set at a distance which is larger than said predetermined pitch, said setting being such that said short rocker arm shafts for said first rocker arm units coincide with axes of those first bearing holes for said short rocker arm shafts which are formed in said holder members, and that said dummy shafts for said second rocker arm units coincide with axes of those second bearing holes for said long rocker arm shaft which comprise throughgoing holes formed in said holder members;

narrowing said distance between said respective holder members down to said predetermined pitch to thereby insert end portions of said short rocker arm shafts and end portions of said dummy shafts into said first bearing holes and said second bearing holes of said holder members; and inserting said long rocker arm shaft into said second bearing holes from one end of an arrangement in series of said holder members to push said dummy shafts out of the other end of said arrangement.

7. A method of assembling rocker arms according to claim 6, further comprising the steps of:

at the above-described step of setting each of said rocker arm units into a space between said respective holder members which are provisionally set, holding together said both rocker arm units such that said short rocker arm shafts and said dummy shafts are grasped at a distance therebetween that is equal to a distance between said first bearing holes and said second bearing holes; and arranging such that a length of protrusion of said dummy shafts beyond said rocker arms of said second rocker arm units becomes longer than a length of protrusion of said short rocker arm shafts beyond said first rocker arm units, whereby, at the above-described step of narrowing said distance between said holder members, said dummy shafts are inserted into said second bearing holes before said short rocker arm shafts are inserted into said first bearing holes.

8. A method of assembling rocker arms according to claim 7, wherein said dummy shafts are inserted into said second bearing holes by causing tapers formed on both ends of said dummy shafts to function as guides.

9. A method of assembling rocker arms in which a plurality of holder members are provided in series at a predetermined pitch and in which said rocker arms are assembled so as to be rotatably supported by a pair of parallel rocker arm shafts which are rotatably and penetratingly supported through said plurality of holder members, said method comprising the steps of:

assembling two sets of rocker arm units by inserting through said rocker arms dummy shafts which are longer than a distance between facing side surfaces of two adjoining pieces of said holder members;

setting each of said rocker arm units into a space between said respective holder members which are provisionally set at a distance which is larger than said predetermined pitch, said setting being made such that said dummy shafts of each of said rocker arm units coincide with axes of a pair of those bearing holes for said rocker arm shafts which are formed in said holder members;

narrowing said distance between said respective holder members down to said predetermined pitch to thereby insert end portions of said dummy shafts into said bearing holes; and inserting said pair of rocker arm shafts into said bearing holes from one end of arrangement in series of said holder members to push said dummy shafts out of the other end of said arrangement.

10. A method of assembling rocker arms according to claim 9, further comprising the steps of:

assembling two sets of rocker arm units, one being intake side and the other being exhaust side, by respectively rotatably supporting them with two sets of intake side and exhaust side dummy shafts, respectively, to hold said both rocker arm units together such that said both dummy shafts are grasped at a distance therebetween that is equal to a distance between bearing holes into which said both dummy shafts are inserted; and arranging such that a length of protrusion of said dummy shafts beyond said one set of rocker arms become longer than a length of protrusion of said dummy shafts beyond the other set of rocker arms, whereby, at said step of narrowing said distance, said one set of dummy shafts is inserted into respective bearing holes before the other set of dummy shafts is inserted into respective remaining bearing holes.

11. A method of assembling rocker arms according to claim 10, wherein said one set of dummy shafts is provided at end portions thereof with tapers so as to cause said tapers to function as guides in inserting said dummy shafts into respective bearing holes.

* * * * *